(12) United States Patent
Stidsen et al.

(10) Patent No.: US 11,930,225 B2
(45) Date of Patent: Mar. 12, 2024

(54) AUDIO VIDEO RECEIVER WITH SIMULTANEOUS MULTIZONE 8K VIDEO ROUTING

(71) Applicant: Lenbrook Industries Limited, Pickering (CA)

(72) Inventors: Gregory R. Stidsen, Andover, MA (US); Kevin Groeneveld, Bowmanville (CA)

(73) Assignee: Lenbrook Industries Limited, Pickering (CA)

( * ) Notice: Subject to any disclaimer, the term of this patent is extended or adjusted under 35 U.S.C. 154(b) by 0 days.

(21) Appl. No.: 17/360,530

(22) Filed: Jun. 28, 2021

(65) Prior Publication Data
US 2022/0417469 A1 Dec. 29, 2022

(51) Int. Cl.
| H04N 21/214 | (2011.01) |
| H04L 12/28 | (2006.01) |
| H04L 27/00 | (2006.01) |
| H04N 7/035 | (2006.01) |
| H04N 7/04 | (2006.01) |
| H04N 7/10 | (2006.01) |
| H04N 21/238 | (2011.01) |
| H04N 21/2381 | (2011.01) |
| H04N 21/2383 | (2011.01) |
| H04N 21/2385 | (2011.01) |
| H04N 21/2389 | (2011.01) |

(Continued)

(52) U.S. Cl.
CPC ..... *H04N 21/2143* (2013.01); *H04L 12/2805* (2013.01); *H04L 27/0002* (2013.01); *H04N 7/0352* (2013.01); *H04N 7/04* (2013.01); *H04N 7/104* (2013.01); *H04N 7/106* (2013.01); *H04N 21/238* (2013.01); *H04N 21/2381* (2013.01); *H04N 21/2383* (2013.01); *H04N 21/2385* (2013.01); *H04N 21/2389* (2013.01); *H04N 21/434* (2013.01); *H04N 21/4347* (2013.01); *H04N 21/43635* (2013.01); *H04L 12/2803* (2013.01); *H04L 2012/2849* (2013.01)

(58) Field of Classification Search
CPC .............................. H04N 7/104; H04N 7/106
See application file for complete search history.

(56) References Cited

U.S. PATENT DOCUMENTS

2009/0228496 A1* 9/2009 Nakatani ................. H04L 69/18
2009/0257360 A1 10/2009 Patel et al.
(Continued)

FOREIGN PATENT DOCUMENTS

WO WO-2023/275614 A1 1/2023
WO WO-2023/275614 A8 1/2023

OTHER PUBLICATIONS

Canadian Intellectual Property Office, International Search Report for PCT/IB2022/000362 (dated Dec. 14, 2022) (Year: 2022).*
(Continued)

Primary Examiner — David N Werner
(74) Attorney, Agent, or Firm — Erik A. Huestis; Sameer K. Pai; Foley Hoag LLP

(57) ABSTRACT

A video switching system, which can be part of an audio video receivers (AVR), enables simultaneous routing of multiple independent video streams (e.g., 8K video streams) received at HDMI inputs of the AVR from digital media sources to multiple selected digital display devices.

20 Claims, 5 Drawing Sheets

(51) Int. Cl.
*H04N 21/434* (2011.01)
*H04N 21/4363* (2011.01)

(56) References Cited

U.S. PATENT DOCUMENTS

| | | | |
|---|---|---|---|
| 2010/0050228 A1* | 2/2010 | Kawashima | H04N 21/4122 |
| | | | 725/151 |
| 2011/0209190 A1 | 8/2011 | Toba | |
| 2011/0239257 A1* | 9/2011 | Bar-Niv | H04N 21/43615 |
| | | | 725/78 |
| 2014/0218614 A1* | 8/2014 | Ho | G09G 5/006 |
| | | | 348/720 |
| 2016/0140075 A1* | 5/2016 | Kashyap | G06F 13/4265 |
| | | | 710/104 |
| 2018/0191653 A1* | 7/2018 | Aggarwal | H04N 21/84 |
| 2018/0302594 A1* | 10/2018 | Taylor | H04H 20/04 |
| 2019/0007719 A1* | 1/2019 | Gordon | H04N 21/6125 |
| 2021/0274347 A1 | 9/2021 | Dua | |

OTHER PUBLICATIONS

Canadian Intellectual Property Office, Written Opinion for PCT/IB2022/000362 (dated Nov. 9, 2022) (Year: 2022).*
AVR-X6700H receiver: Denon: 5 pages (2022).
RX-A8A AV Receiver Specs—Yamaha USA: 5 pages (2022).
Yamaha RX-A8A No 8k, Audioholics Home Theater Forums (2022).
AVR-X2700H receiver: Devon: 11 pages (2022).
Q-SYS I/O-22 Audio Interface: QSC: 5 pages (2022).

\* cited by examiner

AUDIO VIDEO RECEIVER WITH SIMULTANEOUS MULTIZONE 8K VIDEO ROUTING

BACKGROUND

The present application relates generally to Audio Video Receivers (AVRs) and, more particularly, to simultaneous routing of video streams in AVRs between multiple inputs and outputs.

The first AVRs with fully digital video content capability were introduced to the consumer market shortly after 2000. Given the success of DVD and digital television at that time, AVRs with High-Definition Media Interface (HDMI) connections gained rapid consumer adoption. These first HDMI-enabled AVRs switched and routed content from digital media source devices and passed the content to one or more digital display devices. A fully digital video connection was a major advancement over previous AVRs with analog video connections, as digital AVRs preserved the video quality from the source through to the display. Over the following decade, the success of AVRs with HDMI increased competition among manufacturers to offer new AVR models offering higher digital video pixel resolutions. The initial resolution of 1080i ('interlaced') was quickly superseded by 1080p ('progressive'). AVR models with 4K video resolution capability are popular today. Fully professional camera and gaming of resolutions of 8K recently spurred the launch of the first AVR with a single 8K input. The vast quantities of data required for 8K video streams however cause immense design challenge for the design of the hardware electronics. Asides from the limitation of supporting 8K on only one single HDMI input, the market's first 8K AVR cannot route 8K video to display devices in secondary rooms of the home. This was a key feature of many previous AVRs in the market, as it enabled customers to view two different streams of video content in two different rooms of the home (e.g., a movie is displayed in the home theatre while a news channel is displayed in the kitchen). It would be desirable to connect multiple 8K video chipsets in a cost-effective manner that enables this essential 'multizone' video distribution feature.

BRIEF SUMMARY OF THE DISCLOSURE

A video-switching system in accordance with one or more embodiments includes a plurality of multimedia interface connection inputs, each being connectable to and for receiving a video stream from one of a plurality of digital media sources. A set of first transceivers is connected to the multimedia interface connection inputs for receiving the video streams from the multimedia interface connection inputs. Each first transceiver has a plurality of inputs and a plurality of outputs and is configured to simultaneously route video streams received at any of the inputs to any of the outputs, wherein each multimedia interface connection input is connected to a different one of the inputs of the set of first transceivers. A set of second transceivers is connected to the set of first transceivers for receiving the video streams routed by the first transceivers. Each second transceiver has a plurality of inputs and one output and is configured for routing video streams received at any one of the plurality of inputs to the one output, wherein an output of each first transceiver is connected to an input of each second transceiver such that each first transceiver can selectively transmit any one of the video streams received at the first transceiver to a selected second transceiver. A plurality of multimedia interface connection outputs are each connected to the output of a different one of the second transceivers for receiving a video stream from the output of the second transceiver to be displayed on a digital display device connectable to that multimedia interface connection output. A controller is connected to and configured to control operation of each of first transceivers and each of the second transceivers to simultaneously route video streams received at any of the plurality of multimedia interface connection inputs to any of the plurality of multimedia interface connection outputs.

A method in accordance with one or more embodiments is disclosed for simultaneously routing video signals in a video-switching system. The method includes the steps of: (a) receiving a plurality of video streams from a plurality of digital media sources at a plurality of multimedia interface connection inputs; (b) controlling operation of one or more of a plurality of first transceivers to selectively route some or all of the plurality of video streams received at the multimedia interface connection inputs to one or more of a plurality of second transceivers; and (c) controlling operation of the one or more of the plurality of second transceivers to selectively route some or all of the video streams received from the one or more of the plurality of first transceivers to multimedia interface connection outputs to be displayed on digital display devices connected to the multimedia interface connection outputs, such that video streams received at any of the plurality of multimedia interface connection inputs can be selectively and simultaneously routed to any of the plurality of multimedia interface connection outputs.

A method in accordance with one or more embodiments is provided for routing selected video streams received from digital media sources to selected digital display devices in an audio video receiver (AVR). The method includes the steps of: (a) monitoring a plurality of input-side transceiver devices for hot plug events at input connections of the AVR to identify digital media sources connected to the AVR; (b) monitoring a plurality of output-side transceiver devices for hot plug events at output connections of the AVR to identify display devices connected to the AVR; (c) displaying information on the source devices and the display devices connected to the AVR to a user through a user interface; (d) receiving through the user interface a selection by the user to display a video stream from a selected digital media source on a selected display device; (e) enabling an input of an input-side transceiver associated with the selected source device to receive the video stream from the selected source, and enabling an output of the input-side transceiver to transmit the video stream to an output-side transceiver associated with the selected display device; and (f) enabling an input of the output-side transceiver to receive the video stream from the input-side transceiver, and enabling an output of the output-side transceiver to relay the video stream to an output connection of the AVR associated with the selected display device for transmission to the selected display device.

A video-switching system in accordance with one or more embodiments includes a plurality of HDMI connection inputs for receiving video streams from a plurality of digital media sources, the HDMI connection inputs including a first HDMI input, a second HDMI input, a third HDMI input, a fourth HDMI input, a fifth HDMI input, a sixth HDMI input, a seventh HDMI input, and an eight HDMI input. A plurality of 2:2 transceivers, each having a first input, a second input, a first output, and a second output, are configured to simultaneously route video streams received at either of the first and second inputs to either of the first and second outputs.

The plurality of 2:2 transceivers includes a first 2:2 transceiver receiving video streams from the first HDMI input and the second HDMI input, a second 2:2 transceiver receiving video streams from the third HDMI input and the fourth HDMI input, a third 2:2 transceiver receiving video streams from the fifth HDMI input and the sixth HDMI input, and a fourth 2:2 transceiver receiving video streams from the seventh HDMI input and the eight HDMI input. A plurality of 4:1 transceivers, each having a first input, a second input, a third input, a fourth input, and one output, are configured for routing video streams received at any one of the first, second, third, and fourth inputs to the one output. The plurality of 4:1 transceivers includes a first 4:1 transceiver configured to receive video streams from the first output of each of the plurality of 2:2 transceivers and a second 4:1 transceiver configured to receive video streams from the second output of each of the plurality of 2:2 transceivers. A first zone HDMI connection output receives a video stream from the output of the first 4:1 transceiver to be displayed on a first digital display device located in a first zone. A second zone HDMI connection output receives a video stream from the output of the second 4:1 transceiver to be displayed on a second digital display device located in a second zone. A controller is connected to and configured to control operation of each of the plurality of 2:2 transceivers and the plurality of 4:1 transceivers to simultaneously route video streams received at any of the plurality of HDMI connection inputs to any of the plurality of HDMI connection outputs.

BRIEF DESCRIPTION OF THE DRAWINGS

Like or identical reference numbers are used to identify common or similar elements.

DETAILED DESCRIPTION

Figure 1:
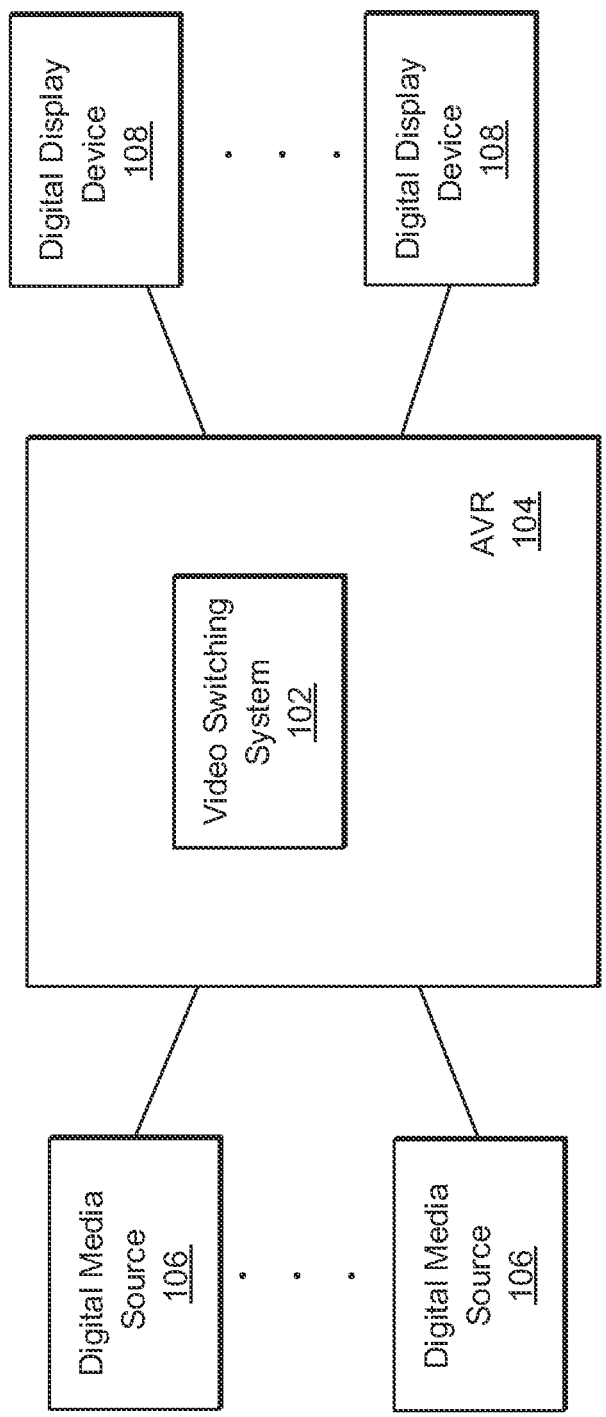
FIG. 1 is a diagram illustrating an exemplary AVR system in accordance with one or more embodiments.

Various embodiments disclosed herein relate to a cost-effective video switching system 102, which can be part of an AVR 104 as depicted in FIG. 1. The video switching system enables simultaneous routing of multiple independent video streams (e.g., 8K video streams) received at HDMI inputs of the AVR 104 from digital media sources (DMS) 106 to multiple selected digital display devices 108.

Non-limiting examples of the digital display devices 108 include televisions and video projectors. Non-limiting examples of digital media sources 106 include set-top boxes, media streaming devices, digital cameras, Blu-ray and DVD players, and gaming consoles.

As discussed below, the video switching system 102 employs a novel video system architecture interconnecting multiple 8K video chips to realize simultaneous routing of multiple 8K video streams from the latest 8K video source devices to the newest 8K televisions and projectors. The system has reduced electronic hardware component cost and heat dissipation. The system is particularly advantageous for home theatre installations and multizone video distribution.

Figure 2:
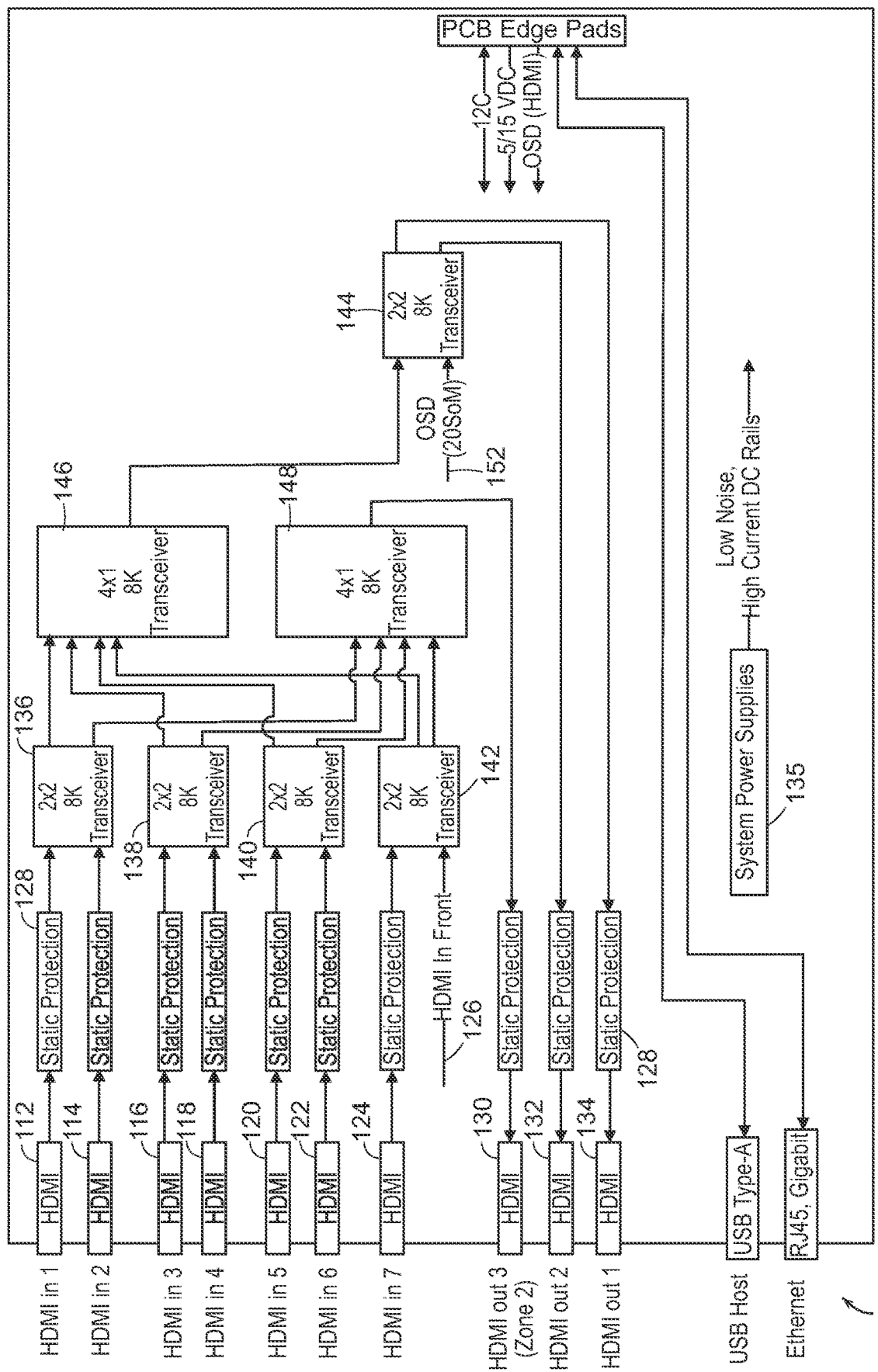
FIG. 2 is a diagram illustrating an exemplary video-switching system in accordance with one or more embodiments.

FIG. 2 illustrates the system architecture of an exemplary video-switching system 102 in accordance with one or more embodiments. This particular architecture features eight HDMI video inputs and three HDMI output connectors. It should be understood that the architecture could be adapted to include any number of inputs and outputs.

The system depicted in FIG. 2 is implemented in a single electric circuit board assembly. Implementation in multiple circuit board assemblies is also possible.

The exemplary video system architecture includes seven HDMI video inputs 112, 114, 116, 118, 120, 122, and 124. In addition, the system includes an eighth HDMI video input 126 at the front of the AVR console.

Each HDMI connector is coupled to a static protection device 128, which functions to prevent static electricity from damaging any of the sensitive and costly core components.

The exemplary system includes three HDMI output connectors 130, 132, 134.

A power supply 135 provides power for the video switching system 102.

The video management core of the system comprises seven specialized 8K video transceiver chips. Five of these transceivers are '2:2' (also referred to as '2×2') 136, 138, 140, 142, 144 and capable of routing two simultaneous video streams to either of its two outputs. The other two transceivers are '4:1' (also referred to as '4×1') 146, 148 and capable of routing one of four selected 8K video streams to one output.

Figure 3:
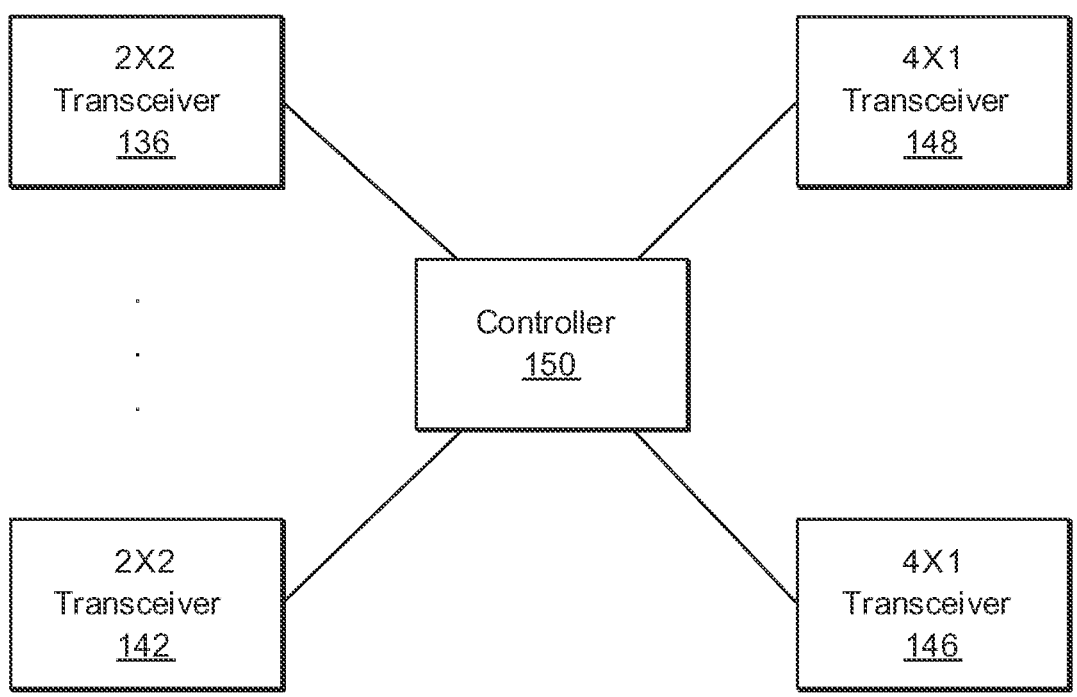
FIG. 3 is a diagram illustrating connection of a controller in the video-switching system in accordance with one or more embodiments.

The operation of each of the seven transceiver chips is controlled by a controller 150 as depicted in FIG. 3. The controller 150 can be provided on the same or different circuit board assembly as the seven transceiver chips.

FIG. 2 depicts the interconnection among the seven transceivers. As shown in the diagram, these connections expand the system's input capability to accept any one of eight incoming video streams from the HDMI input connectors 112, 114, 116, 118, 120, 122, and 124. This is performed by four of the 2:2 transceivers 136, 138, 140, 142. The first output of each 2:2 transceiver 136, 138, 140, 142 is connected to an input of one 4:1 transceiver 146. The second output of each 2:2 transceiver 136, 138, 140, 142 is connected to an input of the second 4:1 transceiver 148. The second 4:1 transceiver 148 can pass any of one of the incoming video streams to the 'zone 2' HDMI output connector 130. The zone 2 output 130 is typically connected to a display device in a room or space remote from the main AVR system installation.

Simultaneously, the first 4:1 transceiver 146 may pass any one of the eight incoming video streams to a final 2:2 transceiver 144 in the tree. This last transceiver 144 may select any one of the incoming video streams to either or both of two HDMI output connectors 132, 134. These last two connectors 132, 134 are commonly referred to as the 'zone 1' or 'main zone' outputs and are typically connected to an 8K display projector and an 8K television.

The last 2:2 transceiver 144 may also select an 'on-screen display' (OSD) video stream 152 generated by the system's main host processor. When selected, this OSD presents a detailed graphical user interface on either or both of the main zone display devices to provide system setup and configuration features.

The above-described 'tree' system topology with the particular placement and connection of the two 4:1 transceivers 146, 148 provides a simultaneous or and non-blocking path for any two of the eight active 8K video streams from the system's inputs to its outputs.

Figure 4:
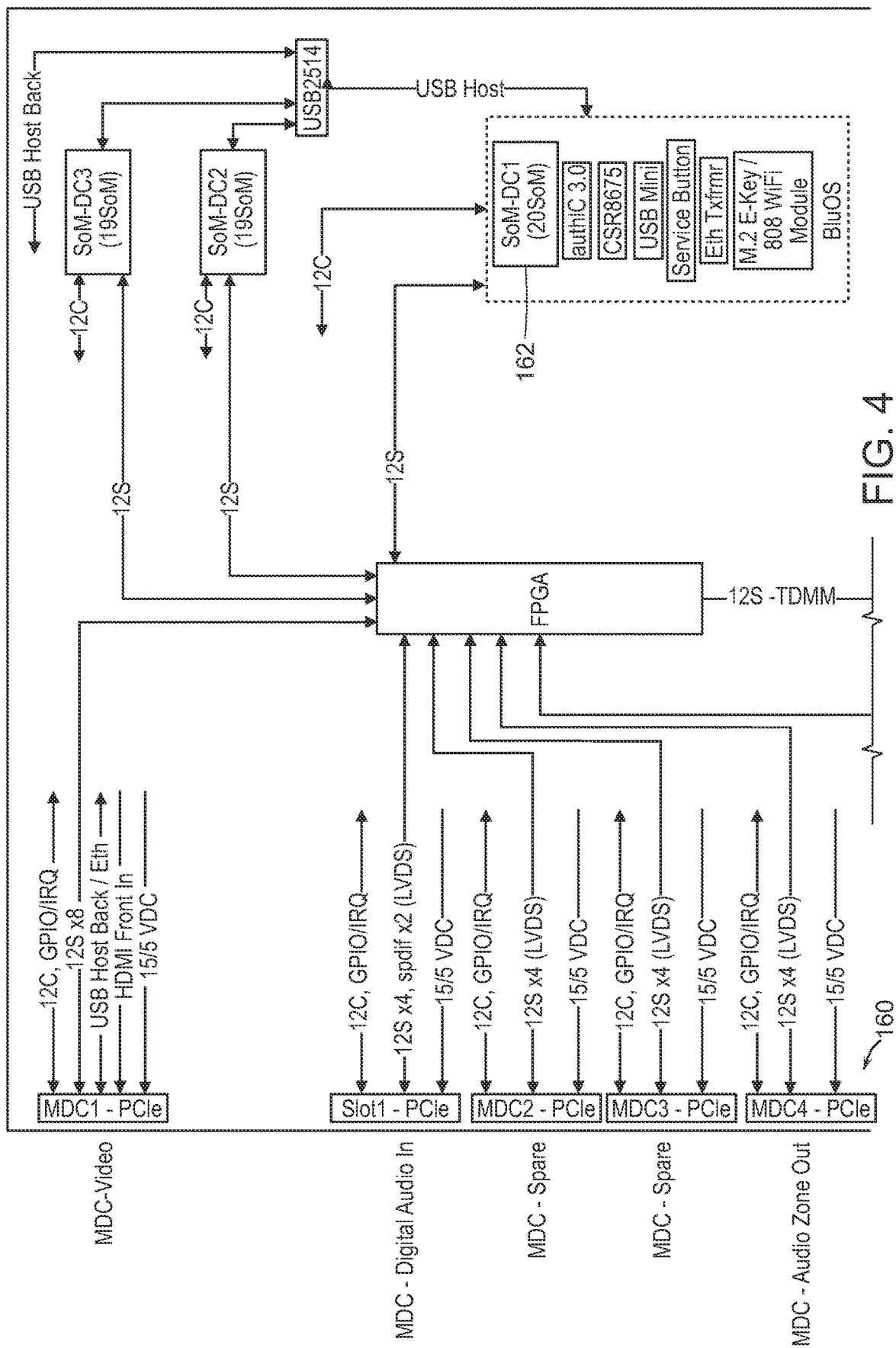
FIG. 4 is a diagram illustrating an exemplary video-switching system controller in accordance with one or more embodiments.

FIG. 4 shows a printed circuit board assembly (PCBA) 160 within the AVR 104, in which the controller 150 is implemented. A microprocessor (SoM-DC1) 162 located on the PCBA 160 is connected to the video switching system circuit board 102 via an Inter-Integrated Circuit (I2C) electrical control bus. All 8K video transceivers 136-148 on the video switching system board 102 are controlled by this microprocessor 162 through the I2C bus. The microprocessor 162 executes an operating system software (identified herein as 'BluOS'), which implements the central video switching controller 150. Each of the video switching system transceiver devices 136-148 can be addressed directly by BluOS through the I2C interface to directly initialize and control each transceiver. After system power-up, BluOS enumerates and confirms the presence of each transceiver device 136-148 in the video switching system.

BluOS evaluates the input connection state of the input-side transceiver devices 136, 138, 140, 142 to confirm which physical HDMI inputs have been connected to a DMS 106. This connection state is determined by reading digital status registers within each transceiver device. HDMI interconnections to external DMS devices 106 are encrypted according to the requirements of Digital Content Protection LLC (DCP). This is performed by the input-side transceivers 136, 138, 140, 142 exchanging security key values with the DMS devices 106 to generate a unique encryption key to 'scramble' digital audio/video data transmitted by the DMS 106.

Through the microprocessor's I2C connection with the output-side transceivers 146, 148, BluOS also enumerates display devices 108 connected to the output-side transceivers 146, 148 via HDMI cable connections. As with the input-side transceivers 136, 138, 140, 142, the connection to each display device 108 is independently validated with DCP security keys to uniquely encrypt and copy-protect the audio/video data transmitted from the output-side transceivers 146, 148 and the connected display devices 108.

While the video switching system 102 is powered, BluOS actively monitors both the input and output side transceivers for HDMI 'hot-plug' events indicated in their on-chip registers. This indicates to BluOS that a user has either connected or disconnected a DMS 106 to either of the input-side transceivers 136, 138, 140, 142 or a display device 108 to the output side transceivers 146, 148. After detection of an HDMI hot-plug event, BluOS re-enumerates the list of DMS devices 106 and display devices 108 connected to the input-side and output-side transceivers.

The BluOS software includes a remote user interface allowing users to view and easily identify each DMS device 106 listed in a custom Android or iOS ('Mobile') app. Alternatively, users may also view list of available DMS devices 106 shown on a TV or projector display device 108 with on-screen display (OSD) graphics. The OSD graphics are generated within BluOS and inserted at 152 into the video switching system 102 with the transceiver 144. The Mobile apps or OSD allow user selection and routing of multiple DMS video streams from its inputs to the system's 'Zone 2' output 130 or its 'Main' zone output 132, 134.

To illustrate how BluOS configures the video switching system's transceivers for concurrently transmitting content from two DMS devices 106 and two display devices 108, consider the following example. A user makes selection in the user-interfaces of either the OSD or Mobile app to display 8K video generated by a game-box on a digital TV 108 connected to the main zone display output 132. In this example, the 8K game-box is connected to HDMI Input 1 (112).

BluOS configures the input-side transceiver 136 to receive game-box video by enabling its first input (the transceiver's second input is not connected but is still actively monitored by BluOS for HDMI hot-plug connection events). As no display devices have been connected to the HDMI 3 Zone 2 output 130, the second output of transceiver 136 is disabled to conserve electrical power. The first output of the transceiver 136 is enabled and configured to pass the game-box's 8K video stream to the next transceiver 146 in the video switching system. Via the I2C connection between the microprocessor 162 and the video switching system 102, BluOS configures the transceiver 146 to pass the game-box video to its single output. The other inputs of this transceiver 146 are not monitored for HDMI hot-plug events, as this transceiver is internal to the system and has no HDMI connections to external DMS devices 106 or display devices 108. BluOS configures the video switching system's final HDMI transceiver 144 to select its first input, receive the 8K game-box video stream data, and relay this data-stream to its first output for transmission through an HDMI cable 132 to the connected display device 108. This HDMI connection to the display device 108 is DCP-encrypted.

After enjoying a video game, the user then pauses the game to connect a second DMS device 106 (in this example, a Blu-ray player) to HDMI Input 5 (120) of the video switching system 102. While the video game is paused, the video switching system 102 continues to pass the video game's paused image through to the first display device. Upon connecting the Blu-ray player to HDMI Input 5 (120), the BluOS controller software queries the status registers of the transceiver 140 and responds to an HDMI hot-plug detect event. The DMS devices 106 are re-enumerated, and the Blu-ray player is added to the list of available DMS devices 106 displayed in the user interfaces of the BluOS Mobile apps and the OSD. The connection between the video switching system 102 and the Blu-ray player is also DCP-authenticated and encrypted.

The user then selects the Blu-ray player in the BluOS Mobile App and selects the HDMI 3 or 'Zone 2' Output 132 as a destination output for the Blu-ray player's video stream. The user notices that no display device is connected to HDMI Zone 2 Output, but sees an available HDMI cable behind the AVR. This is because a professional installer previously mounted an 8K video projector with HDMI cable in an adjacent room that serves as a home theatre. After plugging this cable into the Zone 2 output, a hot-plug event generated by the transceiver 148 causing the BluOS controller software to enumerate the display projector device and add it to the BluOS app's list of display devices. The new projector has valid DCP authentication keys, which it exchanges with the Zone 2 transceiver 148 to establish a fully encrypted connection. The BluOS microprocessor 162 configures the first input of the video transceiver 140 to pass the Blu-ray player content to its second output and onward to the transceiver 148. The output of this output-side transceiver 148 passes the content on to the HDMI Output 3 ('Zone 2') 130.

A second user in the home theater confirms they can see the title screen of a disc inserted in the Blu-ray player connected to the video switching system's Input 5 (120). The first user then confirms they can still see the paused video game on the first display device (the digital TV) and resumes the video game at full 8K video resolution. The second user uses the Blu-ray player's iOS app to initiate playback of the Blu-ray movie title inserted in the Blu-ray player and enjoys the movie at full 8K resolution without interrupting the other user's video game.

Shortly thereafter, the first user recalls that they connected a legacy cable set-top box (STB) via HDMI input 4 (118) because it was listed in the video switching system's OSD. The user then realizes that the set-top box is only capable of 1080p maximum video resolution. This is not an issue for the user, as 1080p resolution is of sufficient quality for the news broadcast she has selected with the STB's remote control. She also uses the BluOS mobile app to select the STB as the input device for the main viewing zone. The associated input-side transceiver 138 of the video switching system 102 has automatically registered this incoming video resolution from the STB and passes the news video stream through the video switching system 102 to the same digital TV that was previously displaying 8K video game content.

Figure 5:
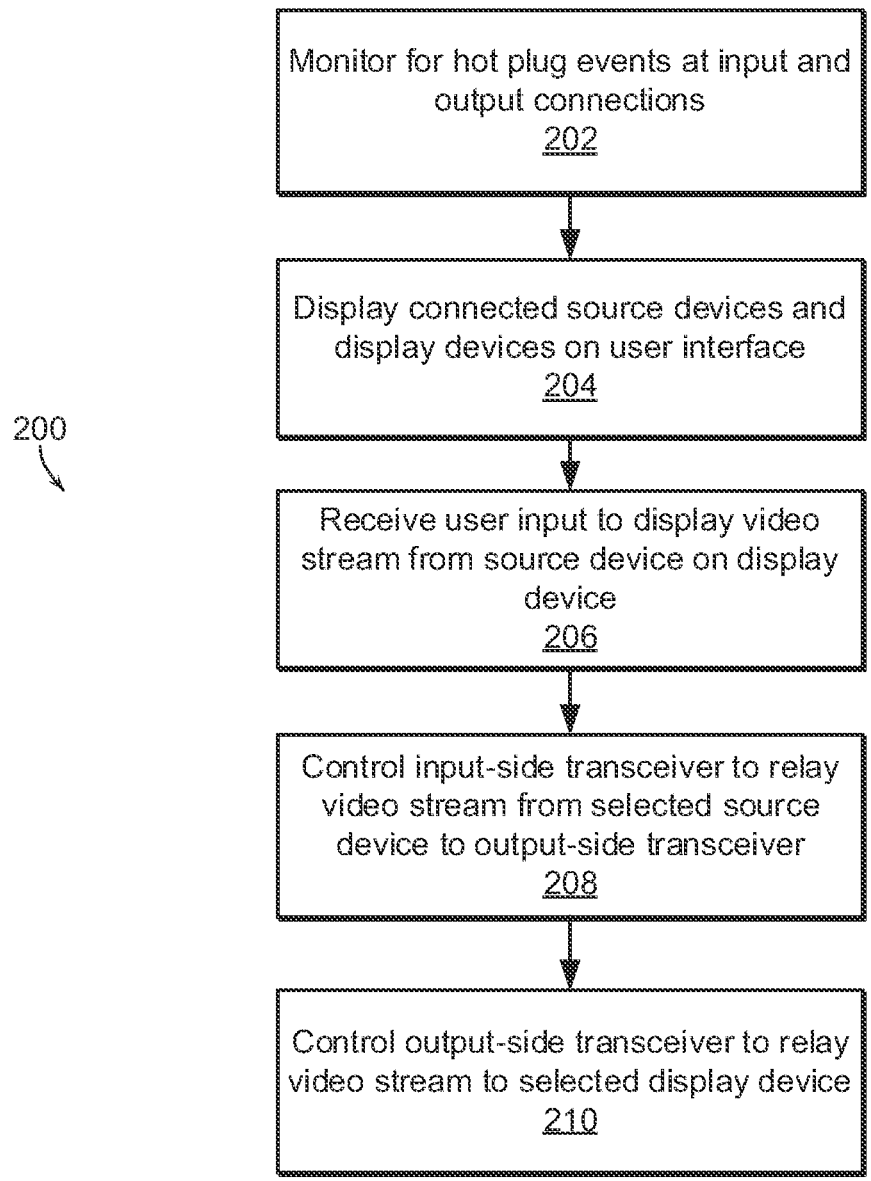
FIG. 5 is a flowchart illustrating exemplary operation of the video-switching system in accordance with one or more embodiments.

FIG. 5 is a flow chart illustrating an exemplary process 200 implemented in the video switching system 102 to route selected video streams received from digital media sources 106 to selected digital display devices 108.

At step 202, the controller 150 monitors input-side transceiver devices 136-142 for hot plug events at input connections of the AVR 104 to determine connections to digital media sources 106. The controller 150 also monitors output-side transceiver devices 146, 148 for hot plug events to determine connections of display devices 108 to the AVR 104.

At step 204, the controller 150 displays information on the connected source devices 106 and the connected display devices 108 to the user through a user interface.

At step 206, the controller 150 receives through the user interface a user selection to display a video stream from a selected digital media source 106 on a selected display device 108.

At step 208, the controller 150 enables an input of the input-side transceiver 136-142 associated with the selected source device 106 to receive the video stream from the selected source. The controller 150 also enables an output of the input-side transceiver 136-142 to transmit the video stream to the output-side transceiver 146, 148 associated with the selected display device 108.

At step 210, the controller 150 enables an input of the output-side transceiver 146, 148 to receive the video from the input-side transceiver 136-142. The controller 150 also enables an output of the output-side transceiver 146, 148 to relay the video stream to the output of the AVR 104 associated with the selected display device 108 for transmission to the selected display device 108.

The controller 150 can be implemented in a microcontroller, microprocessor, digital signal processor, application-specific integrated circuit (ASIC), field programmable gate arrays (FPGA), or any general-purpose or special-purpose circuitry that can be programmed or configured to perform the functions described herein, including controlling operation of the various transceivers to simultaneously route video streams received at the HDMI connection inputs to the connection outputs.

Each of the transceivers can comprise an ASIC, an application-specific standard product (ASSP), an FPGA, or any general-purpose or special-purpose circuitry that can be programmed or configured to perform the functions described herein, including simultaneously routing video streams received at any of its inputs to any of its outputs.

The processes described above for routing video streams may be implemented in software, hardware, firmware, or any combination thereof. The processes are preferably implemented in one or more computer programs executing on the microprocessor. Each computer program can be a set of instructions (program code) in a code module resident in the random access memory of the microprocessor. Until required by the microprocessor, the set of instructions may be stored in another computer memory or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

The invention claimed is:

1. A video-switching system in an audio video receiver (AVR) console, comprising:
   a plurality of multimedia interface connection inputs in the AVR console, each being removably connectable to and for receiving a video stream from one of a plurality of digital media sources;
   a set of first transceivers on one or more circuit boards in the AVR console connected to the multimedia interface connection inputs for receiving the video streams from the multimedia interface connection inputs, each first transceiver having a plurality of inputs and a plurality of outputs and being configured to simultaneously route video streams received at any of the inputs to any of the outputs, wherein each multimedia interface connection input is connected to a different one of the inputs of the set of first transceivers;
   a set of second transceivers on the one or more circuit boards in the AVR console connected to the set of first transceivers for receiving the video streams routed by the first transceivers, each second transceiver having a plurality of inputs and one output and configured for routing video streams received at any one of the plurality of inputs to the one output, wherein an output of each first transceiver is connected to an input of each second transceiver such that each first transceiver can selectively transmit any one of the video streams received at the first transceiver to a selected second transceiver;
   a plurality of multimedia interface connection outputs in the AVR console, each connected to the output of a different one of the second transceivers for receiving a video stream from the output of the second transceiver to be displayed on a digital display device removably connectable to that multimedia interface connection output; and
   a controller on the one or more circuit boards in the AVR console connected to and configured to initialize and directly control operation of each of first transceivers and each of the second transceivers by selectively enabling the inputs and the outputs of the first transceivers and second transceivers to simultaneously route video streams received at any of the plurality of multimedia interface connection inputs to any of the plurality of multimedia interface connection outputs, wherein each first transceiver and each second transceiver is an active transceiver.

2. The system of claim 1, further comprising an additional multimedia interface connection output and a 2:2 transceiver on the one or more circuit boards in the AVR console, said 2:2 transceiver having a first input connected to the output of one of the second transceivers and a second input connected to an on-screen display video stream providing a graphical user interface to provide system setup and configuration features, said 2:2 transceiver having a first output connected to one of the multimedia interface connection outputs and a second output connected to the additional multimedia interface connection output, wherein said 2:2 transceiver is configured for simultaneously routing video streams received at either of the first and second inputs to either of the multimedia interface connection output and the additional multimedia interface connection output.

3. The system of claim 1, wherein the set of first transceivers comprises four 2:2 transceivers, each having two inputs and two outputs; and wherein the set of second transceivers comprises two 4:1 transceivers, each having four inputs and one output.

4. The system of claim 1, wherein the multimedia interface connection inputs comprise High-Definition Multimedia Interface (HDMI) inputs, and wherein the multimedia interface connection outputs comprise HDMI outputs.

5. The system of claim 1, further comprising a plurality of static protection devices on the one or more circuit boards in the AVR console, each connected to one of the plurality of multimedia interface connection inputs to prevent or inhibit damage to components of the system from static electricity.

6. The system of claim 1, wherein the one or more circuit boards comprises a single electric circuit board.

7. The system of claim 1, wherein the video streams comprise 8K video streams.

8. The system of claim 1, wherein the first transceivers and the second transceivers are configured to buffer and reclock video streams to maintain signal integrity.

9. The system of claim 1, wherein the controller is configured to use an inter-integrated circuit control bus to directly control operation of each of first transceivers and each of the second transceivers.

10. A method of simultaneously routing video signals in a video-switching system in an audio video receiver (AVR) console, comprising the steps of:
(a) receiving a plurality of video streams from a plurality of digital media sources at a plurality of multimedia interface connection inputs in the AVR console;
(b) initializing and directly controlling operation of one or more of a plurality of first transceivers on one or more circuit boards in the AVR console to selectively route some or all of the plurality of video streams received at the multimedia interface connection inputs to one or more of a plurality of second transceivers on the one or more circuit boards in the AVR console using a controller on the one or more circuit boards to selectively enable the inputs and the outputs of the first transceivers; and
(c) initializing and directly controlling operation of the one or more of the plurality of second transceivers to selectively route some or all of the video streams received from the one or more of the plurality of first transceivers to multimedia interface connection outputs in the AVR console to be displayed on digital display devices connected to the multimedia interface connection outputs using the controller to selectively enable the inputs and the outputs of the second transceivers, such that video streams received at any of the plurality of multimedia interface connection inputs can be selectively and simultaneously routed to any of the plurality of multimedia interface connection outputs, wherein each of the plurality of first transceivers and each of the plurality of second transceivers is an active transceiver.

11. The method of claim 10, further comprising monitoring the plurality of first transceivers for hot plug events at the plurality of multimedia interface connection inputs to identify digital media sources connected to the video-switching system, and monitoring the plurality of second transceivers for hot plug events at the plurality of multimedia interface connection outputs to identify display devices connected to the video-switching system.

12. The method of claim 10, further comprising controlling operation of the first transceivers and the second transceivers to buffer and reclock the video streams to maintain signal integrity.

13. A method of routing selected video streams received from digital media sources to selected digital display devices in an audio video receiver (AVR) console, comprising the steps of:
(a) monitoring a plurality of input-side transceiver devices on one or more circuit boards in the AVR console for hot plug events at input connections of the AVR console to identify digital media sources connected to the AVR console;
(b) monitoring a plurality of output-side transceiver devices on the one or more circuit boards in the AVR console for hot plug events at output connections of the AVR console to identify display devices connected to the AVR console;
(c) displaying information on the source devices and the display devices connected to the AVR console to a user through a user interface;
(d) receiving through the user interface a selection by the user to display a video stream from a selected digital media source on a selected display device;
(e) enabling an input of an input-side transceiver in the AVR console associated with the selected source device to receive the video stream from the selected source using a controller on the one or more circuit boards, and enabling an output of the input-side transceiver to transmit the video stream to an output-side transceiver in the AVR console associated with the selected display device using the controller; and
(f) enabling an input of the output-side transceiver to receive the video stream from the input-side transceiver using the controller, and enabling an output of the output-side transceiver to relay the video stream to an output connection of the AVR console associated with the selected display device for transmission to the selected display device using the controller, wherein each of the plurality of input-side transceiver devices and each of the plurality of output-side transceiver devices is an active transceiver device.

14. The method of claim 13, further comprising controlling operation of the input-side transceiver and the output-side transceiver to buffer and reclock the video streams to maintain signal integrity.

15. A video-switching system in an audio video receiver (AVR) console, comprising:
- a plurality of HDMI connection inputs in the AVR console for receiving video streams from a plurality of digital media sources, said HDMI connection inputs including a first HDMI input, a second HDMI input, a third HDMI input, a fourth HDMI input, a fifth HDMI input, a sixth HDMI input, a seventh HDMI input, and an eight HDMI input;
- a plurality of 2:2 transceivers on one or more circuit boards in the AVR console, each having a first input, a second input, a first output, and a second output and configured to simultaneously route video streams received at either of the first and second inputs to either of the first and second outputs, said plurality of 2:2 transceivers including a first 2:2 transceiver receiving video streams from the first HDMI input and the second HDMI input, a second 2:2 transceiver receiving video streams from the third HDMI input and the fourth HDMI input, a third 2:2 transceiver receiving video streams from the fifth HDMI input and the sixth HDMI input, and a fourth 2:2 transceiver receiving video streams from the seventh HDMI input and the eight HDMI input;
- a plurality of 4:1 transceivers on the one or more circuit boards in the AVR console, each having a first input, a second input, a third input, a fourth input, and one output and configured for routing video streams received at any one of the first, second, third, and fourth inputs to the one output, said plurality of 4:1 transceivers including a first 4:1 transceiver configured to receive video streams from the first output of each of the plurality of 2:2 transceivers and a second 4:1 transceiver configured to receive video streams from the second output of each of the plurality of 2:2 transceivers;
- a first zone HDMI connection output in the AVR console receiving a video stream from the output of the first 4:1 transceiver to be displayed on a first digital display device located in a first zone;
- a second zone HDMI connection output in the AVR console receiving a video stream from the output of the second 4:1 transceiver to be displayed on a second digital display device located in a second zone; and
- a controller on the one or more circuit boards in the AVR console connected to and configured to initializing and directly control operation of each of the plurality of 2:2 transceivers and the plurality of 4:1 transceivers to simultaneously route video streams received at any of the plurality of HDMI connection inputs to any of the plurality of HDMI connection outputs by selectively enabling the inputs and the outputs of the 2:2 transceivers and 4:1 transceivers,
- wherein each of the plurality of 2:2 transceivers and each of the plurality of 4:1 transceivers is an active transceiver.

16. The system of claim 15, further comprising a static protection device on the one or more circuit boards connected to each of the plurality of HDMI connection inputs to prevent or inhibit damage to components of the system from static electricity.

17. The system of claim 15, further comprising an additional first zone HDMI connection output in the AVR console and a fifth 2:2 transceiver on the one or more circuit boards in the AVR console, said fifth 2:2 transceiver having a first input connected to the output of the first 4:1 transceiver and a second input connected to an on-screen display video stream providing a graphical user interface to provide system setup and configuration features, said fifth 2:2 transceiver having a first output connected to the first zone HDMI connection output and a second output connected to the additional first zone HDMI connection output, wherein said fifth 2:2 transceiver is configured for simultaneously routing video streams received at either of the first and second inputs to either of the first zone HDMI connection output and the additional first zone HDMI connection output.

18. The system of claim 15, wherein the one or more circuit boards comprises a single electric circuit board.

19. The system of claim 15, wherein the video streams comprise 8K video streams.

20. The system of claim 15, wherein the plurality of 2:2 transceivers and the plurality of 4:1 transceivers are configured to buffer and reclock video streams to maintain signal integrity.

* * * * *